United States Patent
Pulikanti et al.

(10) Patent No.: US 12,009,693 B2
(45) Date of Patent: Jun. 11, 2024

(54) APPARATUS AND METHOD FOR FLUX MANAGEMENT IN IMPEDANCE ISOLATION SINGLE CONVERSION(ZISC) BASED UPS SYSTEM

(71) Applicant: ABB Schweiz AG, Baden (CH)

(72) Inventors: Sridhar Pulikanti, Napier (NZ); Simon Walton, Napier (NZ); Robert Turner, Hastings (NZ); Nicholas James Elliott, Hastings (NZ)

(73) Assignee: ABB SCHWEIZ AG, Baden (CH)

( * ) Notice: Subject to any disclaimer, the term of this patent is extended or adjusted under 35 U.S.C. 154(b) by 101 days.

(21) Appl. No.: 17/758,553

(22) PCT Filed: Jan. 9, 2020

(86) PCT No.: PCT/EP2020/050459
§ 371 (c)(1),
(2) Date: Jul. 8, 2022

(87) PCT Pub. No.: WO2021/139891
PCT Pub. Date: Jul. 15, 2021

(65) Prior Publication Data
US 2023/0035249 A1     Feb. 2, 2023

(51) Int. Cl.
*H02J 9/06*      (2006.01)
*H02J 3/38*      (2006.01)
*H02M 1/40*    (2007.01)

(52) U.S. Cl.
CPC ............. *H02J 9/062* (2013.01); *H02J 3/388* (2020.01); *H02M 1/40* (2013.01)

(58) Field of Classification Search
CPC ............. H02J 9/062; H02J 3/388; H02M 1/40
See application file for complete search history.

(56) References Cited

U.S. PATENT DOCUMENTS

2008/0088183 A1* 4/2008 Eckroad .................... H02J 3/16
                                                                    307/66
2009/0009005 A1* 1/2009 Luo ........................ H02M 7/493
                                                                    307/82
(Continued)

FOREIGN PATENT DOCUMENTS

EP     2731230 A1    5/2014
EP     3012943 A2    4/2016
(Continued)

OTHER PUBLICATIONS

Decision of Patent, issued by the Japan Patent Office, for corresponding Patent Application No. JP 2022-540887, mailed on Aug. 29, 2023; 3 pp.
(Continued)

*Primary Examiner* — Carlos Amaya
(74) *Attorney, Agent, or Firm* — Greenberg Traurig, LLP

(57) ABSTRACT

Embodiments of present disclosure relate to apparatus and method for flux management in the ZISC based UPS system. The apparatus comprises: a first determining unit configured to determine a first offset flux on a series reactor in the ZISC based UPS system when power quality events occur in a grid connected to the ZISC based UPS system and the ZISC based UPS system operates in a grid-connected mode; and a first resetting unit configured to provide synthetic impedance damping to the series reactor to reset the first offset flux.

14 Claims, 3 Drawing Sheets

(56) References Cited

U.S. PATENT DOCUMENTS

2014/0021789 A1     1/2014   Greer
2016/0118847 A1*   4/2016   Colombi ................ H02J 9/061
                                                                                                        307/65

FOREIGN PATENT DOCUMENTS

| | | |
|---|---|---|
| EP | 3293852 A1 | 3/2018 |
| EP | 3447882 A1 | 2/2019 |
| JP | S6387133 A | 4/1988 |
| JP | H11313449 A | 11/1999 |
| JP | 2016119730 A | 6/2016 |
| WO | 2008017014 A2 | 2/2008 |
| WO | 2008126820 A1 | 10/2008 |
| WO | 2014192696 A1 | 12/2014 |

OTHER PUBLICATIONS

Information Disclosure Statement and Written Opinion, issued by the ISA/EP European Patent Office, regarding corresponding patent application Serial No. PCT/EP2020/050459; dated Oct. 5, 2020; 17 pages.

* cited by examiner

APPARATUS AND METHOD FOR FLUX MANAGEMENT IN IMPEDANCE ISOLATION SINGLE CONVERSION(ZISC) BASED UPS SYSTEM

CROSS-REFERENCE TO RELATED APPLICATIONS

This is a national stage application which claims priority to International patent application Serial No.: PCT/EP2020/050459, filed on Jan. 9, 2020; and which is herein incorporated by reference in its entirety.

FIELD

Embodiments of the present disclosure generally relate to the field of power converter system, and more particularly, to apparatus and method for flux management in an impedance isolation single conversion (ZISC) based uninterruptible power supply (UPS) system.

BACKGROUND

Electrical or electronic equipment used in all types of industrial processes are vulnerable to power quality events in a grid. Power quality of the grid is related to variations in grid voltages in the form of momentary interruptions, voltage sags or swells, transients, harmonic distortion, electrical noise, and flickering lights, among others. In order to mitigate the effects of the power quality events and reduce the overall cost of customer continuous processes applications to make them more productive, efficient, and safe, one of the most common solutions is uninterruptible power supply (UPS). Different UPS systems have been developed targeting different customers. For example PCS100 UPS aimed for industrial customers is an offline single conversion UPS system consisting of static switches, a power conversion system and an energy storage system. Recently a new architecture for the UPS system called as ZISC based UPS system is developed. The ZISC based UPS system is combination of components of the offline single conversion UPS and rotary UPS systems.

In a steady-state grid-connected mode, when the grid is healthy, the ZISC based UPS system regulates its output voltage by exchanging power with the grid in order to compensate a voltage drop across a series reactor. In a case, when a voltage sag event occurs during the ZISC based UPS system operating in the grid-connected mode, a delta voltage across the series reactor leads to an offset flux. The offset flux on the series reactor may cause magnetic saturation of the series reactor, which results in a very high current in a power conversion system and leads to a large distortion in the output voltage of the ZISC based UPS system. In another case, when the ZISC based UPS system operates in the grid-connected mode or an island mode, if a network feeder with downstream transformers is energised then it will results in flow of high inrush currents which may disturb the flux of a coupling transformer. In both cases, it will result in sympathetic saturation phenomena between the coupling transformer and downstream transformers, thus resulting in the distortion of the output voltage. Hence, the reliability of the ZISC based UPS system in protecting a customer load will be adversely effected.

Thus, an offset flux resetting mechanism is required to improve the reliability and robustness of the ZISC based UPS system under above mentioned cases.

SUMMARY

In view of the foregoing problems, various example embodiments of the present disclosure provide apparatus and method for flux management in the ZISC based UPS system to avoid the magnetic saturation in the ZISC based UPS system.

In a first aspect of the present disclosure, example embodiments of the present disclosure provide an apparatus for flux management in the ZISC based UPS system. The apparatus comprises: a first determining unit configured to determine a first offset flux on a series reactor in the ZISC based UPS system when power quality events occur in a grid connected to the ZISC based UPS system and the ZISC based UPS system operates in a grid-connected mode; and a first resetting unit configured to provide synthetic impedance damping to the series reactor to reset the first offset flux.

In some embodiments, the apparatus further comprises: a second determining unit configured to determine a second offset flux on a transformer in the ZISC based UPS system when the ZISC based UPS system operates in the grid-connected mode or an island mode; and a second resetting unit configured to reset the second offset flux in response to a magnitude of the second offset flux exceeding a flux magnitude limit.

In some embodiments, the transformer is a coupling transformer or a downstream transformer.

In some embodiments, the second determining unit comprises: a voltage observer configured to determine a voltage on the transformer; and a flux estimator configured to estimate the second offset flux based on the determined voltage on the transformer and an intrinsic time constant term specific to the transformer.

In some embodiments, the voltage observer is further configured to: determine the voltage on the transformer based on a voltage at a terminal of a power conversion system in the ZISC based UPS system or an output voltage of the ZISC based UPS system.

In some embodiments, the second resetting unit comprises: a flux magnitude extractor configured to extract the magnitude of the second offset flux; a comparator configured to compare the magnitude of the second offset flux with the flux magnitude limit; a multiplier configured to multiply the second offset flux with a correction factor in response to the magnitude of the second offset flux exceeding the flux magnitude limit to provide a compensation voltage; and a subtractor configured to subtract the compensation voltage from a target voltage reference to obtain a corrected voltage reference.

In a second aspect of the present disclosure, example embodiments of the present disclosure provide a method for flux management in the ZISC based UPS system. The method comprises: determining a first offset flux on a series reactor in the ZISC based UPS system when power quality events occur in a grid connected to the ZISC based UPS system and the ZISC based UPS system operates in a grid-connected mode; and providing synthetic impedance damping to the series reactor to reset the first offset flux.

In some embodiments, the method further comprises: determining a second offset flux on a transformer in the ZISC based UPS system when the ZISC based UPS system operates in the grid-connected mode or an island mode; and in response to a magnitude of the second offset flux exceeding a flux magnitude limit, resetting the second offset flux.

In some embodiments, the transformer is a coupling transformer or a downstream transformer.

In some embodiments, determining the second offset flux comprises: determining a voltage on the transformer; and estimating the second offset flux based on the determined voltage on the transformer and an intrinsic time constant term specific to the transformer.

In some embodiments, determining the voltage on the transformer comprises: determining the voltage on the transformer based on a voltage at a terminal of a power conversion system in the ZISC based UPS system or an output voltage of the ZISC based UPS system.

In some embodiments, resetting the second offset flux in response to the magnitude of the second offset flux exceeding the flux magnitude limit comprises: extracting the magnitude of the second offset flux; comparing the magnitude of the second offset flux with the flux magnitude limit; in response to the magnitude of the second offset flux exceeding the flux magnitude limit, multiplying the second offset flux with a correction factor to provide a compensation voltage; and subtracting the compensation voltage from a target voltage reference to obtain a corrected voltage reference.

It is to be understood that the Summary section is not intended to identify key or essential features of embodiments of the present disclosure, nor is it intended to be used to limit the scope of the present disclosure. Other features of the present disclosure will become easily comprehensible through the following description.

DESCRIPTION OF DRAWINGS

Through the following detailed descriptions with reference to the accompanying drawings, the above and other objectives, features and advantages of the example embodiments disclosed herein will become more comprehensible. In the drawings, several example embodiments disclosed herein will be illustrated in an example and in a non-limiting manner, wherein.

Throughout the drawings, the same or similar reference symbols are used to indicate the same or similar elements.

DETAILED DESCRIPTION OF EMBODIMENTS

Figure 1:
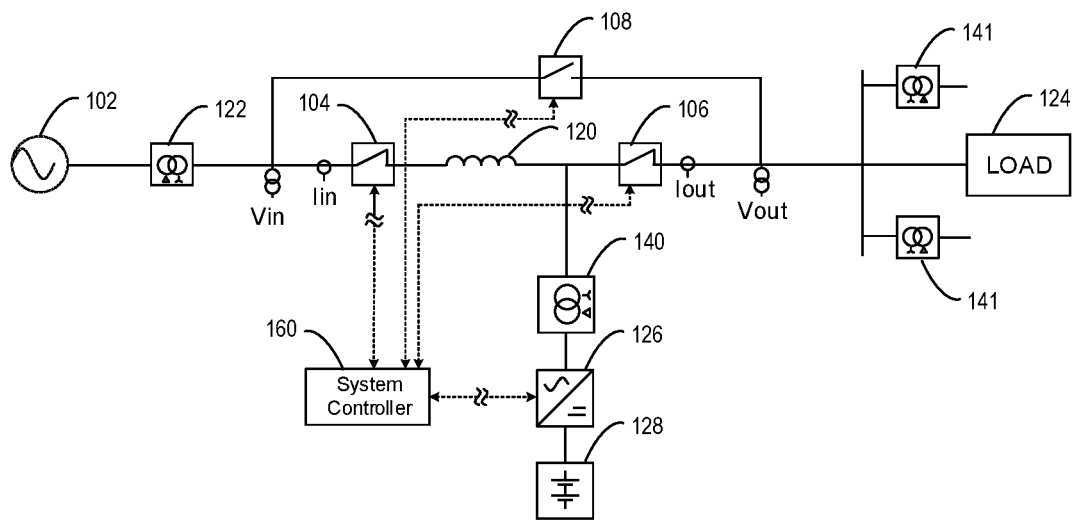
FIG. 1 is a schematic diagram illustrating the ZISC based UPS system operating in a grid-connected mode in accordance with an embodiment of the present disclosure.

Principles of the present disclosure will now be described with reference to several example embodiments shown in the drawings. Though example embodiments of the present disclosure are illustrated in the drawings, it is to be understood that the embodiments are described only to facilitate those skilled in the art in better understanding and thereby achieving the present disclosure, rather than to limit the scope of the disclosure in any manner.

The term "comprises" or "includes" and its variants are to be read as open terms that mean "includes, but is not limited to." The term "or" is to be read as "and/or" unless the context clearly indicates otherwise. The term "based on" is to be read as "based at least in part on." The term "being operable to" is to mean a function, an action, a motion or a state can be achieved by an operation induced by a user or an external mechanism. The term "one embodiment" and "an embodiment" are to be read as "at least one embodiment." The term "another embodiment" is to be read as "at least one other embodiment." The terms "first," "second," and the like may refer to different or same objects. Other definitions, explicit and implicit, may be included below. A definition of a term is consistent throughout the description unless the context clearly indicates otherwise.

FIG. 1 is a schematic diagram illustrating the ZISC based UPS system operating in a grid-connected mode in accordance with an embodiment of the present disclosure. The ZISC based UPS system is electrically coupled to the grid 102 via an optional delta-wye transformer 122. The ZISC based UPS system includes an input coupled to the grid 102 or the delta-wye transformer 122 and an output coupled to a load 124. An input voltage Vin and an input current Iin may be provided to the UPS system from the grid 102. An output voltage Vout and an output current Iout may be provided to the load 124 from the UPS system. Moreover, the ZISC based UPS system includes a network feeder with downstream transformers 141.

As shown in FIG. 1, the ZISC based UPS system includes an input switch 104 electrically coupled to the input of the ZISC based UPS system, an output switch 106 electrically coupled to the output of the ZISC based UPS system, and a bypass switch 108 coupled between the input and output of the ZISC based UPS system.

The ZISC based UPS system further includes a series reactor 120, a coupling transformer 140, a power conversion system 126 and an energy storage 128. The series reactor 120 is electrically coupled between the input switch 104 and the output switch 106. The coupling transformer 140 is electrically coupled to a node between the series reactor 120 and the output switch 106. The power conversion system 126 is electrically coupled to the coupling transformer 140. The energy storage 128 is electrically coupled to the power conversion system 126.

The ZISC based UPS system further includes a system controller 160 coupled to the input switch 104, the output switch 106, and the bypass switch 108. The system controller 160 is configured to regulate the power exchange between the UPS system and the grid 102 by operating the switches 104, 106, and 108. The ZISC based UPS system may operate in a grid-connected mode or an island mode.

During the grid-connected mode, the input switch 104 and the output switch 106 are closed and the bypass switch 108 is opened. The UPS system controls the output voltage magnitude and frequency by regulating the power exchange between the UPS system and the grid 102. The steady state output voltage is controlled to achieve high fidelity voltage source to the connected load 124.

If the voltage sag magnitude and duration are significant then the UPS system transits to the island mode. In the island mode, the input switch 104 and the bypass switch 108 are opened and the output switch 106 is closed. Thus, the UPS system operates as a grid forming converter system by controlling the output voltage Vout with given voltage magnitude and frequency references.

During the voltage sag event, when the UPS system operates in the grid connected mode, a delta voltage across the series reactor 120 leads to a first offset flux on the series reactor 120. The degree of the first offset flux is a function of system damping characteristics. During the voltage sag event, the peak flux of the series reactor 120 should not exceed a saturation limit. In order to reset the first offset flux on the series reactor 120, the system controller 160 may provide synthetic impedance damping to reset the first offset flux of the series reactor 120 to zero.

Figure 2:
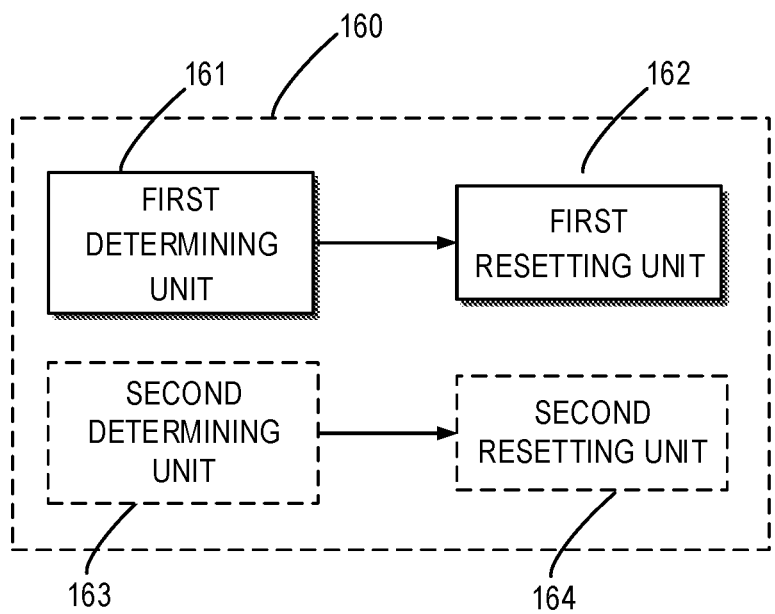
FIG. 2 is a schematic diagram illustrating an apparatus for flux management in the ZISC based UPS system in accordance with an embodiment of the present disclosure.

FIG. 2 is a schematic diagram illustrating an apparatus for flux management in the ZISC based UPS system in accordance with an embodiment of the present disclosure. The apparatus may be embodied as the system controller 160 of the UPS system or another controller for the UPS system. As shown in FIG. 2, the system controller 160 includes a first determining unit 161 and a first resetting unit 162. When power quality events occur in the grid 102 and the ZISC based UPS system operates in the grid-connected mode, the first determining unit 161 determines the first offset flux on the series reactor 120. Herein, the first determining unit 161 may only determine occurrence of the first offset flux on the series reactor 120, instead of determining the value of the first offset flux. Then, the first resetting unit 162 provides the synthetic impedance damping to the series reactor 120 to reset the first offset flux.

In process of resetting the first offset flux on the series reactor 120 to zero, the offset flux of the coupling transformer 140 migrates away from its centre. As a result, when the peak flux of the coupling transformer 140 exceeds its saturation level, it will lead to a current limit of the power conversion system 126. Transformer saturation also occurs in other grid or load events such as grid phase shift events, large load steps (eg motor starts), parallel operation, and crash recovery during faults etc.

One solution to minimise the saturation behaviour of the coupling transformer 140 is by raising the flux margin. This solution will add extra iron to the coupling transformer 140 which increases the cost of the whole UPS system. Moreover, raising the flux margin of coupling transformer 140 is not a solution as the downstream transformers 141 (distribution transformers) have the same behavior and their design is based on customer power system requirements (out of the scope of UPS manufacturer). Second solution is to minimise the UPS output voltage magnitude reference during the upstream voltage sag to improve the flux margin of the coupling transformer 140. The reduction of UPS output voltage magnitude during the upstream power quality events is driven through UPS system performance standards. To implement this solution, one of the key challenges is to determine the power quality events in very short time. Third solution is to open the input switch 104 more quickly to prevent the magnetic saturation of the coupling transformer 140. However, there are very limited solutions available in open market.

When the magnetic saturation of the coupling transformer 140 occurs due to the offset flux of the coupling transformer 140 migrating away from its centre, the UPS output voltage Vout may distort and further result in sympathetic saturation phenomena. As shown in FIG. 2, in order to avoid the sympathetic saturation phenomena, the system controller 160 further includes a second determining unit 163 and a second resetting unit 164. When the ZISC based UPS system operates in the grid-connected mode or the island mode, the second determining unit 163 determines a second offset flux on the coupling transformer 140. The second resetting unit 164 resets the second offset flux in response to the magnitude of the second offset flux exceeding a flux magnitude limit.

A cost effective, robust and reliable solution for avoiding the magnetic saturation is obtained by controlling the core flux of the coupling transformer 140 based on the voltage on the coupling transformer 140.

Figure 3:
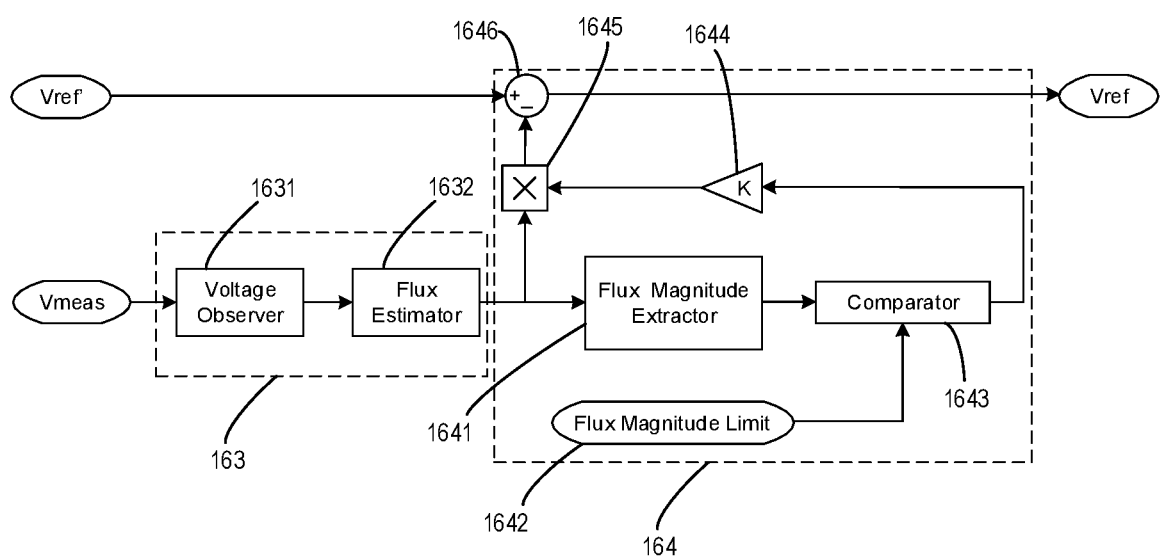
FIG. 3 is a schematic diagram illustrating a second determining unit and a second resetting unit in accordance with an embodiment of the present disclosure.

FIG. 3 is a schematic diagram illustrating the second determining unit 163 and the second resetting unit 164 in accordance with an embodiment of the present disclosure. As shown in FIG. 3, the system controller 160 considers a measured or estimated voltage Vmeas on the coupling transformer 140 and estimates the second offset flux on the coupling transformer 140. The second determining unit 163 includes a voltage observer 1631 and a flux estimator 1632.

The voltage observer 1631 is adapted to determine the voltage on the coupling transformer 140 based on the measured or estimated voltage Vmeas. The voltage Vmeas may be a terminal voltage of the power conversion system 126 or the output voltage Vout of the ZISC based UPS system, depending upon the operation mode of the UPS system and optimisation on transformer flux. For example, during a start-up mode, the voltage observer 1631 may select internal voltage estimates as the output switch 106 is opened. The voltage observer 1631 estimates the terminal voltage of the power conversion system 126 through the measured output voltage Vout of the UPS system and an estimated voltage drop across the coupling transformer 140. The selection of the terminal voltage of the power conversion system 126 or the UPS output voltage Vout depends on better flux estimation of the flux model.

The flux estimator 1632 is adapted to estimate the second offset flux based on the determined voltage on the coupling transformer 140 and an intrinsic time constant term specific to the transformer 140. For example, a rotating transformer flux vector may be estimated based on first principles including a time-integral of the observer voltage assuming that the flux starts from a known value, e.g., zero or other values. The rotating transformer flux vector is used as the second offset flux on the coupling transformer 140.

As shown in FIG. 3, the second resetting unit 164 includes a flux magnitude extractor 1641 adapted to extract the magnitude of the second offset flux from vector components of the second offset flux. A transformer flux magnitude limit is defined based on either a specified or nominal rated flux value for the coupling transformer 140, where a nominal flux vector magnitude typically corresponds with the nominal or peak operating voltage. In a flux magnitude comparator 1643, the magnitude of the second offset flux is compared to the specified flux magnitude limit and in case if the magnitude of the second offset flux exceeds the flux magnitude limit, a correction factor (e.g., a gain K, labeled as 1644) based on the excess flux magnitude is provided to a multiplier 1645. In the multiplier 1645, the second offset flux is multiplied with the correction factor in response to the magnitude of the second offset flux exceeding the flux magnitude limit to provide a compensation voltage. Then, in a subtractor 1646, the compensation voltage is subtracted from a target voltage reference Vref' to obtain a corrected voltage reference Vref. The corrected voltage reference Vref is utilized to generate corresponding pulse width modulated (PWM) signal.

It is to be understood that the magnetic saturation of the downstream transformers 141 may be eliminated in analogous manners. The proposed idea also improves the system output voltage performance during energisation of the downstream transformers 141. The proposed idea effectively manages saturation and much better results may be obtained by increasing the flux margin of the UPS transformer (either by raising transformer flux margin or minimize the UPS output voltage magnitude reference as mentioned above) as it experiences more voltage during upstream voltage sags.

For a three wire three phase system, the voltage compensation and flux level terms may be represented in the stationary reference frame or a rotating reference frame or individually in the time domain using phase quantities or other non-orthogonal axes.

It is to be understood that the proposed idea is applicable for the flux management of other shunt connected grid-supporting voltage source system.

Example embodiments of the present disclosure also provide a method for flux management in the ZISC based UPS system. The method may be implemented by the apparatus as described above with reference to FIGS. 1-3.

Figure 4:
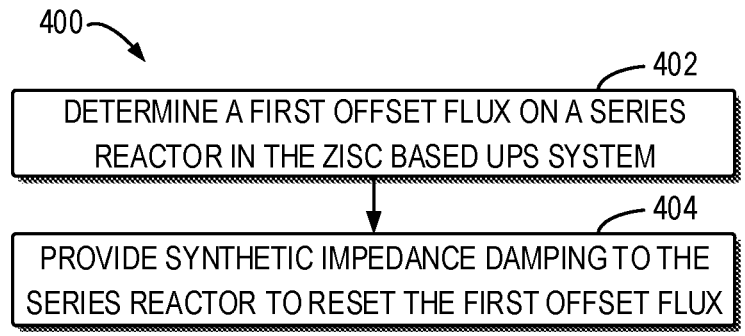
FIG. 4 is a flowchart illustrating a method for controlling a first offset flux on a series reactor in the ZISC based UPS system in accordance with an embodiment of the present disclosure.

FIG. 4 is a flowchart illustrating a method for controlling the first offset flux on the series reactor in accordance with an embodiment of the present disclosure. As shown in FIG. 4, the method 400 includes: at 402, determining a first offset flux on a series reactor in the ZISC based UPS system when power quality events occur in a grid connected to the ZISC based UPS system and the ZISC based UPS system operates in a grid-connected mode; and at 404, providing synthetic impedance damping to the series reactor to reset the first offset flux.

Figure 5:
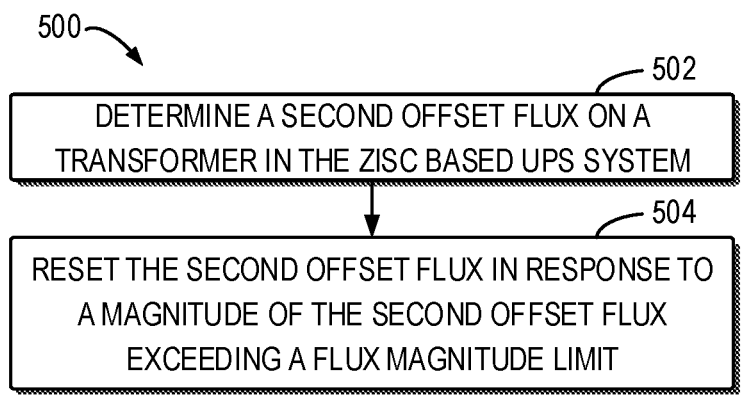
FIG. 5 is a flowchart illustrating a method for controlling a second offset flux on a transformer in the ZISC based UPS system in accordance with an embodiment of the present disclosure.

FIG. 5 is a flowchart illustrating a method for controlling the second offset flux on the transformer in the ZISC based UPS system in accordance with an embodiment of the present disclosure. In some embodiments, as shown in FIG. 5, the method 500 further includes: at 502, determining a second offset flux on the transformer in the ZISC based UPS system when the ZISC based UPS system operates in the grid-connected mode or the island mode; and at 504, in response to a magnitude of the second offset flux exceeding a flux magnitude limit, resetting the second offset flux.

In some embodiments, the transformer is a coupling transformer or a downstream transformer.

In some embodiments, determining the second offset flux comprises: determining a voltage on the transformer; and estimating the second offset flux based on the determined voltage on the transformer and an intrinsic time constant term specific to the transformer.

In some embodiments, determining the voltage on the transformer comprises: determining the voltage on the transformer based on a voltage at a terminal of a power conversion system in the ZISC based UPS system or an output voltage of the ZISC based UPS system.

In some embodiments, resetting the second offset flux in response to the magnitude of the second offset flux exceeding the flux magnitude limit comprises: extracting the magnitude of the second offset flux; comparing the magnitude of the second offset flux with the flux magnitude limit; in response to the magnitude of the second offset flux exceeding the flux magnitude limit, multiplying the second offset flux with a correction factor to provide a compensation voltage; and subtracting the compensation voltage from a target voltage reference to obtain a corrected voltage reference.

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

The invention claimed is:

1. An apparatus for flux management in an impedance isolation single conversion (ZISC) based uninterruptible power supply (UPS) system, the apparatus comprising:
    a first determining unit configured to determine a first offset flux on a series reactor in the ZISC based UPS system when power quality events occur in a grid connected to the ZISC based UPS system and the ZISC based UPS system operates in a grid-connected mode;
    a first resetting unit configured to provide synthetic impedance damping to the series reactor to reset the first offset flux;
    a second determining unit configured to determine a second offset flux on a transformer in the ZISC based UPS system when the ZISC based UPS system operates in the grid-connected mode or an island mode; and
    a second resetting unit configured to reset the second offset flux in response to a magnitude of the second offset flux exceeding a flux magnitude limit.

2. The apparatus according to claim 1, wherein the transformer is a coupling transformer or a downstream transformer.

3. The apparatus according to claim 2, wherein the second determining unit comprises:
    a voltage observer configured to determine a voltage on the transformer; and
    a flux estimator configured to estimate the second offset flux based on the determined voltage on the transformer and an intrinsic time constant term specific to the transformer.

4. The apparatus according to claim 1, wherein the second determining unit comprises:
    a voltage observer configured to determine a voltage on the transformer; and
    a flux estimator configured to estimate the second offset flux based on the determined voltage on the transformer and an intrinsic time constant term specific to the transformer.

5. The apparatus according to claim 4, wherein the voltage observer is further configured to:
    determine the voltage on the transformer based on a voltage at a terminal of a power conversion system in the ZISC based UPS system or an output voltage of the ZISC based UPS system.

6. The apparatus according to claim 5, wherein the second resetting unit comprises:
    a flux magnitude extractor configured to extract the magnitude of the second offset flux;

a comparator configured to compare the magnitude of the second offset flux with the flux magnitude limit;

a multiplier configured to multiply the second offset flux with a correction factor in response to the magnitude of the second offset flux exceeding the flux magnitude limit to provide a compensation voltage; and a subtractor configured to subtract the compensation voltage from a target voltage reference to obtain a corrected voltage reference.

7. The apparatus according to claim 4, wherein the second resetting unit comprises:

a flux magnitude extractor configured to extract the magnitude of the second offset flux;

a comparator configured to compare the magnitude of the second offset flux with the flux magnitude limit;

a multiplier configured to multiply the second offset flux with a correction factor in response to the magnitude of the second offset flux exceeding the flux magnitude limit to provide a compensation voltage; and a subtractor configured to subtract the compensation voltage from a target voltage reference to obtain a corrected voltage reference.

8. A method for flux management in an impedance isolation single conversion (ZISC) based uninterruptible power supply (UPS) system, the method comprising:

determining a first offset flux on a series reactor in the ZISC based UPS system when power quality events occur in a grid connected to the ZISC based UPS system and the ZISC based UPS system operates in a grid-connected mode;

providing synthetic impedance damping to the series reactor to reset the first offset flux;

determining a second offset flux on a transformer in the ZISC based UPS system when the ZISC based UPS system operates in the grid-connected mode or an island mode; and in response to a magnitude of the second offset flux exceeding a flux magnitude limit, resetting the second offset flux.

9. The method according to claim 8, wherein the transformer is a coupling transformer or a downstream transformer.

10. The method according to claim 9, wherein determining the second offset flux comprises:

determining a voltage on the transformer; and estimating the second offset flux based on the determined voltage on the transformer and an intrinsic time constant term specific to the transformer.

11. The method according to claim 8, wherein determining the second offset flux comprises:

determining a voltage on the transformer; and estimating the second offset flux based on the determined voltage on the transformer and an intrinsic time constant term specific to the transformer.

12. The method according to claim 11, wherein determining the voltage on the transformer comprises:

determining the voltage on the transformer based on a voltage at a terminal of a power conversion system in the ZISC based UPS system or an output voltage of the ZISC based UPS system.

13. The method according to claim 12, wherein resetting the second offset flux in response to the magnitude of the second offset flux exceeding the flux magnitude limit comprises:

extracting the magnitude of the second offset flux;

comparing the magnitude of the second offset flux with the flux magnitude limit;

in response to the magnitude of the second offset flux exceeding the flux magnitude limit, multiplying the second offset flux with a correction factor to provide a compensation voltage; and subtracting the compensation voltage from a target voltage reference to obtain a corrected voltage reference.

14. The method according to claim 11, wherein resetting the second offset flux in response to the magnitude of the second offset flux exceeding the flux magnitude limit comprises:

extracting the magnitude of the second offset flux;

comparing the magnitude of the second offset flux with the flux magnitude limit;

in response to the magnitude of the second offset flux exceeding the flux magnitude limit, multiplying the second offset flux with a correction factor to provide a compensation voltage; and subtracting the compensation voltage from a target voltage reference to obtain a corrected voltage reference.

\* \* \* \* \*